United States Patent [19]
Chern et al.

[11] Patent Number: 5,698,147
[45] Date of Patent: Dec. 16, 1997

[54] FABRICATION METHODS FOR LOW IMPEDANCE LITHIUM POLYMER ELECTRODES

[75] Inventors: Terry Song-Hsing Chern, Midlothian, Va.; Kenneth Orville MacFadden, Highland; Steven Lloyd Johnson, Arbutus, both of Md.

[73] Assignee: W. R. Grace & Co.-Conn., New York, N.Y.

[21] Appl. No.: 653,170

[22] Filed: May 24, 1996

[51] Int. Cl.$^6$ .................................................. C04B 35/00
[52] U.S. Cl. .................................... 264/104; 264/105
[58] Field of Search .................................. 264/104, 105

[56] References Cited

U.S. PATENT DOCUMENTS

| | | | |
|---|---|---|---|
| 4,818,643 | 4/1989 | Cook | 429/188 |
| 5,219,679 | 6/1993 | Abraham | 429/192 |
| 5,395,711 | 3/1995 | Tahara | 429/197 |

*Primary Examiner*—James Derrington
*Attorney, Agent, or Firm*—Howard J. Troffkin

[57] ABSTRACT

A process for fabricating an electrolyte-electrode composite suitable for high energy alkali metal battery that includes mixing composite electrode materials with excess liquid, such as ethylene carbonate or propylene carbonate, to produce an initial formulation, and forming a shaped electrode therefrom. The excess liquid is then removed from the electrode to compact the electrode composite which can be further compacted by compression. The resulting electrode exhibits at least a 75% lower resistance.

19 Claims, No Drawings

FABRICATION METHODS FOR LOW IMPEDANCE LITHIUM POLYMER ELECTRODES

This invention was made with Government support under Contract DE-FC02-91CE50336 awarded by the United States Department of Energy. The Government has certain rights in this invention.

BACKGROUND OF THE INVENTION

1. Field of the Invention

This invention pertains to battery components and cells and to processes for forming the components, including electrodes. More specifically, the present invention relates to a process for forming polymer electrodes that exhibit higher loading of active material resulting in a high energy battery.

2. Description of the Related Art

Storage batteries have a configuration composed of at least one pair of electrodes of opposite polarity, generally arranged in a series of adjacent electrodes of alternating polarity. The current flow between electrodes is maintained by an electrolyte composition capable of carrying ions between electrode pairs.

Non-aqueous batteries have certain distinct advantages over other types of storage batteries. They use light-weight metals, such as alkali metals as for example lithium metal, lithium oxides, lithium-aluminum alloys and the like, which are at the far end of the electromotive series. These batteries have the potential for providing much higher specific (gravimetric) energy and volumetric energy densities (capacity per unit weight and volume, respectively) than other types of batteries. This improved potential is due to the low atomic weight of the metals utilized, and the high potential for forming a battery in conjunction with suitable positive electrodes far removed in the electromotive series from the light weight metal (alkali metal) electrode. The battery can be formed in any conventional physical design, such as cylindrical, rectangular or disc-shaped "button" cells, normally of a closed cell configuration.

The battery components include positive electrode, negative electrode, electrolyte and an insulating (non-conductive) material located between the electrodes. In certain instances, the insulating material is a porous membrane used in conjunction with a liquid electrolyte composition. In other instances, a solid or gel material constitute both the insulating and electrolyte functions. Batteries formed of these components can be in the form of alternating plates in a sandwich design or of a continuously spirally wound "jelly-roll" design as are well known.

Electrolyte in the form of gel or solid electrolyte are disclosed in U.S. Pat. No. 5,219,679 to Abraham et al., the disclosure of which is incorporated herein by reference. Such electrolytes, described generally as a solid polymer electrolyte (SPE), is a polymer, non-aqueous liquid in which ions are conducted and contain alkali metal (e.g. lithium) ion exchange complexes. Illustrative of known non-aqueous liquids useful in SPE include acetonitrile, tetrahydrofuran and its derivatives, ethylene carbonate, propylene carbonate, various sulfones and mixtures of these liquids. The liquid contains a light metal salt such as lithium salts as for example, $LiPF_6$, $LiAsF_6$, $LiCF_3SO_3$, and $LiClO_4$ and the like. The polymers typically used in SPE's include polyacrylonitrile, poly(tetraethylene glycol diacrylate) poly(vinylidene difluoride) and poly(vinylpyrrolidone) and the like.

Methods of forming solid polymer electrolyte-electrode composites and battery components are disclosed in a copending U.S. patent application having common assignment with the present application Ser. No. 08/653,172, filed May 24, 1996 (Attorney Docket No. 01-9189), and Ser. No. 08/653,174, filed May 24, 1996 (Attorney Docket No. 01-8788) the teachings of which are incorporated herein by reference.

Briefly, the process involves extruded electrode blends consisting of electrochemically active and electrically conductive materials (e.g. graphite or coke for anodes or an alkali metal chalcogenide such as lithium manganese oxide, lithium cobalt oxide, or the like, alone or with a conductive aid such as carbon for cathodes) and components of a solid polymer electrolyte. The solid polymer electrolyte components are a blend of a polymer, such as polyacrylonitrile (PAN) or polyvinylidene difluoride (PVDF), a lithium salt such as described hereinabove and a liquid, preferably a mixture of ethylene carbonate (EC) and propylene carbonate (PC).

According to a preferred embodiment disclosed in the above referenced application, the first step in the electrode extrusion process is to mix the components of the solid polymer electrolyte with the appropriate electrochemically active and/or electrically conductive materials. The composite materials are fed to a twin-screw extruder fitted with a die to produce the desired electrolyte-electrode composite product of desired shape (e.g. sheet). The electrode product comprises a solid, highly filled sheet material having, for example, about 40 to 80 weight percent electrochemically active and/or electrically conductive solids within a matrix of SPE making up from about 2 to 8 weight percent polymer, 10 to 40 percent organic liquid and remainder being electrolyte salt and, optionally, other extrusion aids and materials.

Batteries made according to the above invention can unexpectedly be improved by reducing the impedance of the resulting composite electrolyte-electrode by application of the present invention.

It is highly desirable to be able to provide a polymer bonded electrode that exhibits high charge density; that is capable of sustaining high discharge rates; and that is capable of exhibiting very low capacity loss upon charge-discharge cycling. In addition, the electrode should be capable of being easily fabricated, exhibiting a high degree of uniformity, being flexible material that can be readily formed into desired configurations, and maintain its integrity under the conditions encountered in a battery (including expansion-contraction of cycling).

The above desired characteristics must be obtained using compositions and physical processing systems having their own preferred material attributes. The degree of compaction of the electrode material effects many of the above parameters. On a simple physical level, the more compact the electrode is, the greater the density is of the active and conductive materials, the closer the spacing is between the active materials and the ion-exchange medium, and the more efficient the transfer of ions is within the electrode.

A need exists for processes that provide more compact electrodes, providing a higher degree of loading and of lower impedance.

SUMMARY OF THE INVENTION

The present invention provides a process for fabricating lithium polymer electrolyte-electrode composites that have a higher degree of compaction and loading, reduced composite impedance, and an associated increase in specific energy and power.

The process involves mixing the composite electrode materials, preferably with an excess of SPE liquid to produce an initial formulation, and forming a shaped electrode with the initial formulation. Such a process is fully disclosed in the copending U.S. application Ser. No. 08/653,172, filed May 24, 1996, (Attorney Docket No. 01-9189) and U.S. Ser. No. 653,174, filed May 24, 1996, (Attorney Docket No. 01-8788). The electrode is then subjected to elevated temperatures to remove a portion of the SPE liquid. The composite contracts and the electrode formed becomes more compact without the need for a separate compaction step.

Advantageously, the highly-plasticized initial formulation is easily processed. In addition, the method allows a wider range of electrode formulations to be processed into various shapes, such as thin films. Most significantly, the method allows better compaction of the electrolyte-electrode composite, without the need for compressing, and results in an electrode having a lower impedance.

Other features and advantages of the present invention will become apparent from the following description of the invention.

DETAILED DESCRIPTION OF THE PREFERRED EMBODIMENTS

The present process provides an improved electrode product capable of exhibiting a substantially lower impedance value than its precursor electrode. The present process requires forming an electrode composed of a mixture of electrochemically active and/or electrically conductive solid materials with components of solid polymer electrolyte. The components are generally a polymer, an organic liquid, and an alkali metal salt, as more fully described herein below. The mixture is extruded into a composite product which is substantially non-porous having the solid material contained within the solid polymer electrolyte matrix. The sheet product is then processed to remove a portion of the organic solvent(s) used in the initial mixture. It has been unexpectedly found that the removal of solvent causes compaction of the sheet product to achieve a high degree of reduction in the impedance value of the electrode product.

The active electrode material(s) can be selected depending upon whether an anode or a cathode composite electrode is desired. For anodes, the active material typically is a conductor, such as carbon, that can intercalate the lighter metal ions, such as lithium. Most preferably, graphite or coke is used. For cathodes, the preferred active electrode materials include elements at the opposite end of the electromotive series from lithium, such as metal chalcogenides, as for example, lithium manganese oxides, over lithiated manganese oxides, cobalt oxides, vanadium oxides, nickel oxides and the like, and most preferably is $LiMn_2O_4$ and overlithiated manganese dioxide.

The solid polymer electrolyte is composed of a binder, a liquid and an electrolyte salt. The binder is preferably a polymer such as polyacrylonitrile, poly(tetraethylene glycol diacrylate) (PEGDA), poly(vinylidene difluoride) (PVDF) and poly(vinyl pyrrolidinone) (PVP), or the like. Suitable copolymers of these polymers can also be used.

The salt is preferably a salt of the light-metals, most preferably lithium, such as $LiPF_6$, $LiAsF_6$, $LiCF_3SO_3$, $LiClO_4$, or the like and mixtures thereof.

The liquid of the SPE may be organic solvents, such as the aprotic solvents capable of solvating the salt as, for example, ethylene carbonate, propylene carbonate, dimethyl carbonate, diethyl carbonate, dimethyl adipate, tetramethylene sulphone, γ-butyrolactone, dimethylformamide, dioctyl phthalate, and dibutyl phthalate and the like.

The feed composition used to form the precursor electrode may be the same as that conventionally used to provide the resultant electrode. The solid particulate component may be present in from about 40 to about 80 weight percent of the total feed. The SPE polymer may be present in from about 2 to about 8, preferably about 3 to about 6 weight percent of the total feed. The liquid SPE component may be present in from about 10 to about 40 weight percent of the total feed. The remainder may be composed of the SPE salt, as described above. The mixture should be such that the resultant electrode has a high content of solid particulate which is contained within an SPE matrix and the matrix provides a substantially solid or gel (very high viscosity material bonding the particulate).

The feed mix may contain other optional components such as colorants, dispersants, and the like. The electrode may further be extruded in manners to provide a current collector (e.g. conductive metal screen or grid) to be located on one surface or imbedded in the sheet product.

The resultant composite electrolyte-electrode is a solid, flexible sheet product. In a preferred embodiment, the SPE liquid is added in excess of the amount considered to be desirable to obtain a functioning electrode. In other words, the liquids are added at a level above that would be considered to result in an electrode having the desired physical and electrical characteristics. For example, the liquid may be added at levels of up to 25 percent, preferably up to 15 percent by weight in excess of that desired.

The formed precursor electrode of the present invention is processed to remove a portion of the SPE liquid contained therein. The removal of the liquid can be done by any conventional means capable of removing liquid from the electrode, such as subjecting the electrode to elevated temperature (e.g. 40° C. to 150° C., preferably 70° C. to 130° C.) or reduced pressure or combinations thereof for a period of time suitable to remove all of the excess amount of solvent initially used or to remove a portion (e.g. up to about 20 weight %) of the conventional amount of solvent used or both. The time of application of the means of removing the liquid will depend on the nature of the liquid, specific temperature or reduced pressure used and can be readily determined by minor process design tests.

It has been unexpectedly found that the removal of a portion of SPE liquid electrode provides a resultant product which exhibits a substantially lower impedance than precursor materials which have not undergone the removal step disclosed herein. It is believed, although not meant to be a limitation on the present invention, that the removal of solvent from the electrode causes the SPE matrix to compact causing a higher degree of contact among the electrochemically active and/or electrically conductive solid particulate materials therein. It has been found that even removal of small amounts of solvent provides large reduction in impedance.

The following examples are made for illustrative purposes only and are not meant to be a limitation on the invention, as defined by the claims appended hereto. All parts and percentages are by weight unless otherwise indicated.

EXAMPLE 1

An electrolyte-cathode blend having the following composition was mixed in an Omni mixer at 135° C.:

| Component | Wt % |
| --- | --- |
| Manganese oxide | 59 |
| LiPF$_6$ | 1.4 |
| Polyacrylonitrile (PAN) | 2.3 |
| Ethylene carbonate/ propylene carbonate | 19.5 |
| Carbon black | 7.6 |

The resulting mixture was pressed into a thin film, 8.5-mils in thickness, on aluminum foil. The film was dried at room temperature for 16 hours, and at 40° C. for four hours.

After drying, the composition of the electrode is as follows:

| Component | Wt % |
| --- | --- |
| Manganese oxide | 70 |
| LiPF$_6$ | 1.6 |
| Polyacrylonitrile (PAN) | 2.7 |
| Ethylene carbonate/ propylene carbonate | 17.2 |
| Carbon black | 9 |

In addition, the drying reduced the thickness of the film to 7 mils.

The resulting cathode had a polarization resistance of 50 ohm-cm$^2$. A cell built with the electrode had a specific energy of over 70 Wh/kg and a specific power of over 320 W/kg.

EXAMPLE 2

The cathode formed above was compared to an electrode formed without adding and removing excess plasticizer. The comparative cathode had the following composition:

| Component | Wt % |
| --- | --- |
| Manganese oxide | 65 |
| LiPF$_6$ | 1.5 |
| Polyacrylonitrile | 2.5 |
| Ethylene carbonate/ propylene carbonate | 23 |
| Carbon black | 8.3 |

A cathode 8 mils in thickness was formed. The polarizing resistance of the comparative electrode was 200 ohm-cm$^2$. A typical cell made using the comparative electrode had a specific energy of 45 Wh/kg and a specific power of 90 W/kg.

EXAMPLE 3

An electrolyte-cathode was formed in the same manner as in Example 1 except that the formulation was:

| Component | Wt. % |
| --- | --- |
| Manganese Oxide | 61.7 |
| LiPF$_6$ | 0.8 |
| Polyacrylonitrile | 3.9 |
| Ethylene Carbonate/Propylene Carbonate 50:50 | 25.1 |
| Acetylene Black | 7.3 |
| Dispersant (Hypermer KD1) | 1.2 |

The electrodes were cut into sheets of approximately 8 by 11 inches (1100 cm$^2$) and sets of six were subjected to a heated oven at varying temperatures for varying times as shown in the Table below, to remove liquid. The initial electronic resistance was measured to be 14,000 ohms. The following Table summarizes the average post drying resistance and weight loss.

TABLE

Effect of Drying Temperature and Time on Resistance and Weight Loss

| Temperature (Celcius) | Time at Temperature (minutes) | Average Weight Loss (wt % of initial) | Average Resistance (ohms) |
| --- | --- | --- | --- |
| Control | 0 | 0.0 | 14,000 |
| 100 | 5 | 4.1 +/- 0.6 | 1009.4 |
| 100 | 9 | 8.6 +/- 0.6 | 97.1 |
| 100 | 14 | 12.2 +/- 0.6 | 16.0 |
| 115 | 7 | 9.2 +/- 1.2 | 116.6 |
| 115 | 14 | 19.2 +/- 0.9 | 9.6 |
| 130 | 5 | 9.2 +/- 1.6 | 113.5 |
| 130 | 9 | 17.5 +/- 1.9 | 7.8 |

Cells fabricated from these cathodes with less than 50 ohm resistance demonstrated a fifty ohm-cm$^2$ impedance.

Although the present invention has been described in relation to particular embodiments thereof, many other variations and modifications and other uses will be come apparent to those skilled in the art. Therefore, the present invention is to be limited not by the specific disclosure herein, but only by the appended claims.

What is claimed is:

1. A process for fabricating polymer electrodes comprising the steps of:
   i) forming a mixture comprising active components selected from the group consisting of electrochemically active particulate material, electrically conductive particulate material and mixtures thereof; and solid polymer electrolyte comprising electrolyte metal salt, polymer binder and electrolyte organic liquid, wherein said liquid is present in excess of the effective amount to provide an effective composite electrode;
   ii) shaping the mixture into a desired electrolyte-electrode suitable for use in a battery; and
   iii) compacting the composite electrolyte-electrode by removing a portion of the electrolyte organic liquid contained therein.

2. The process of claim 1, wherein the step of compacting the composite comprises subjecting the composite to elevated temperature for a time sufficient to remove a portion of the electrolyte organic liquid.

3. The process of claim 1, wherein the step of compacting the composite comprises subjecting the composite to reduced pressure for a time sufficient to remove a portion of the electrolyte organic liquid.

4. The process of claim 3, wherein the mixture formed according to step (i) contains the electrolyte organic liquid in at least about 20 percent excess of the effective amount of the electrolyte organic liquid to provide the composite electrode.

5. The process of claim 4, wherein the portion of the electrolyte organic liquid removed is the excess of liquid.

6. The process of claim 1, wherein the step of mixing the solid polymer electrolyte-electrode materials comprises blending a solid active electrode material with a solid polymer electrolyte component composed of polymer binder, electrolyte salt and adding thereto an electrolyte organic liquid.

7. The process of claim 1, wherein the solid polymer electrolyte composition is electrically non-conductive and ionically conductive.

8. The process of claim 1, wherein the polymer binder is selected from the gap consisting of polyacrylonitrile, polyvinylidene difluoride, poly(tetraethylene glycol diacrylate), polyvinyl pyrrolidinone, copolymers of said polymers and mixtures thereof.

9. The process of claim 1, wherein the electrolyte organic liquid is an aprotic organic liquid capable of solvating the metal salt.

10. The process of claim 9, wherein the electrolyte organic liquid is selected from the group consisting of ethylene carbonate, propylene, carbonate, dimethyl carbonate, diethyl carbonate, dimethyl adipate, tetramethylene sulphone, γ-butyrolactone, dimethylformamide, dioctyl phthalate, and dibutyl phthalate and mixtures thereof.

11. The process of claim 10, wherein the electrolyte organic liquid is a mixture of ethylene carbonate and propylene carbonate.

12. The process of claim 1, wherein the salt is a lithium salt.

13. The process of claim 12, wherein the salt is selected from the group consisting of $LiPF_6$, $LiAsF_6$, $LiCF_3SO_3$, $LiClO_4$ or mixtures thereof.

14. The process of claim 1, wherein the active components is a mixture of at least one metal chalcogenide and at least one conductive particulate material.

15. The process of claim 14, wherein the solid active components is in the form of a dry particulate.

16. The process of claim 14, wherein the metal chalcogenide is selected from the group consisting of lithium manganese dioxide and overlithiated manganese dioxide.

17. The process of claim 1, wherein the active components is a carbon capable of intercalating alkali metal ions within its structure.

18. The process of claim 1, further comprising the step of adhering a current collector to the electrode composite.

19. The process of claim 8, wherein the electrode formed is a cathode having an impedence of less than 50 ohm-$cm^2$.

* * * * *